United States Patent Office 3,506,092
Patented Apr. 14, 1970

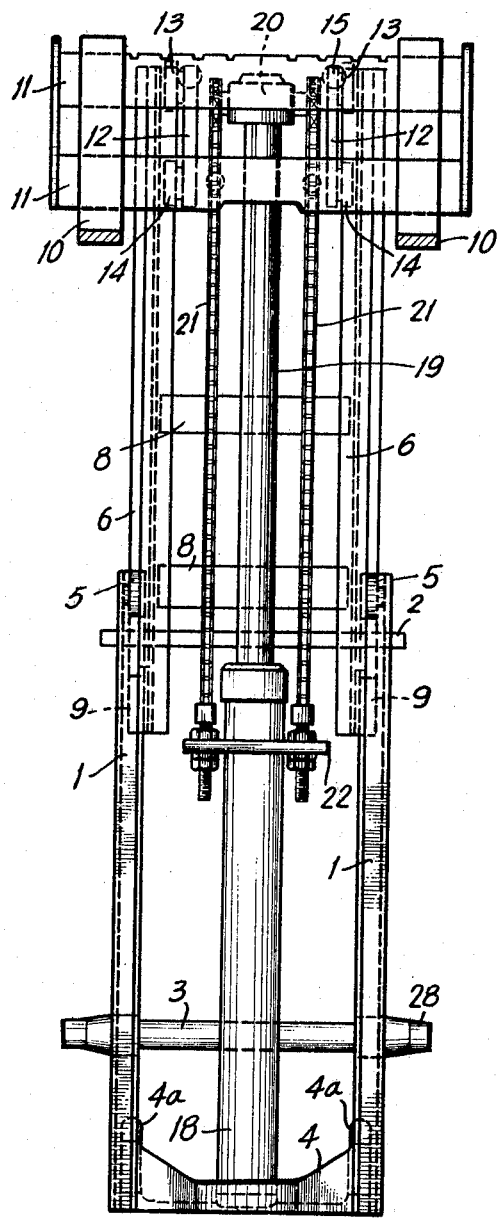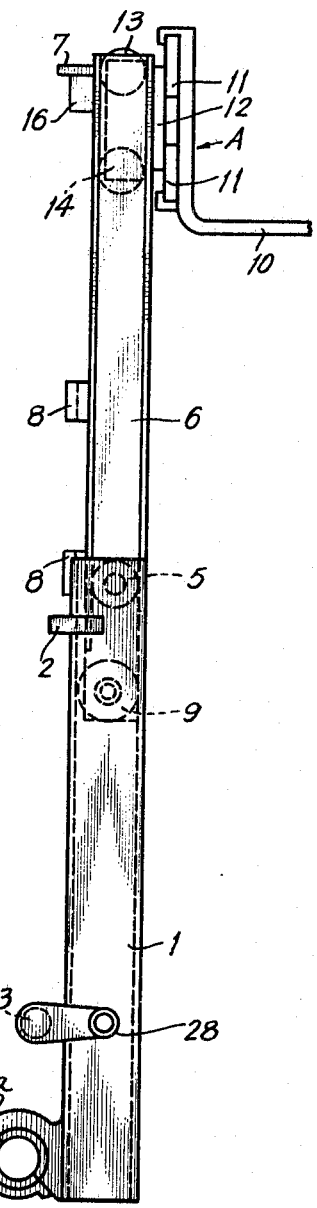

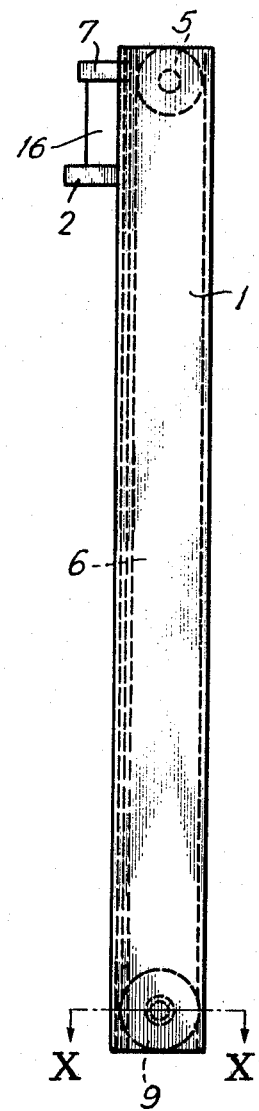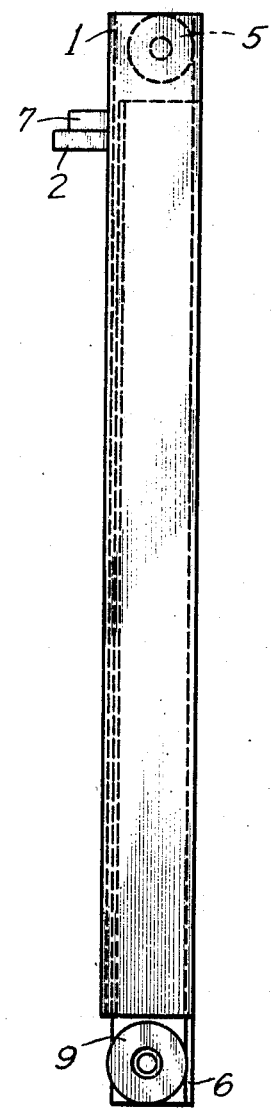

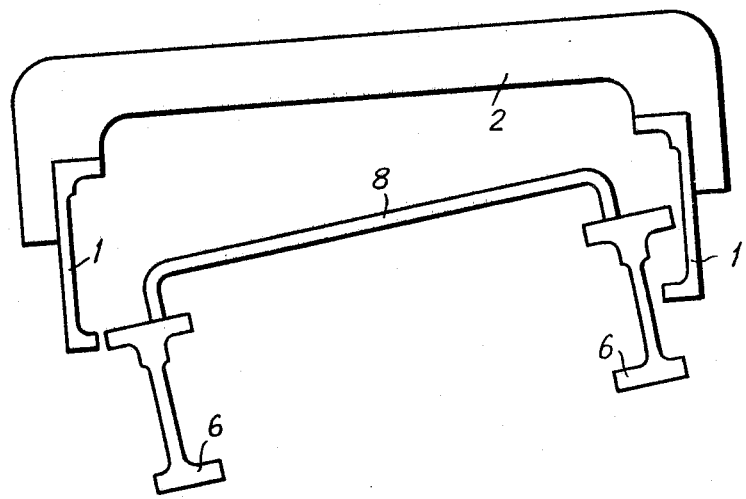
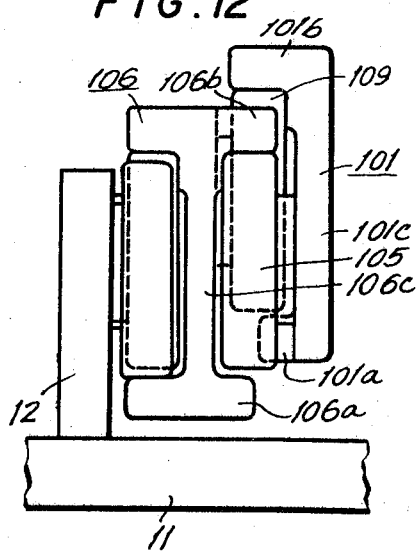
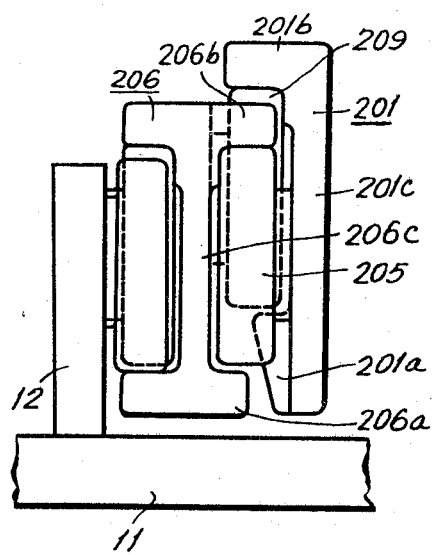

3,506,092
LIFT TRUCK
Akibumi Shinoda and Goro Nishi, Chita-gun, Japan, assignors to Toyoda Automatic Loom Works, Ltd., Kariya-shi, Aichi-ken, Japan
Filed June 27, 1968, Ser. No. 740,567
Claims priority, application Japan, July 14, 1967, 42/45,426
Int. Cl. B66b 7/02, 9/20
U.S. Cl. 187—9                5 Claims

ABSTRACT OF THE DISCLOSURE

A load lifting apparatus having a pair of laterally spaced channel shaped stationary uprights, a pair of laterally spaced I-shaped extensible uprights adapted for longitudinal movement with respect to said stationary uprights and a load carriage adapted for longitudinal movement with respect to said uprights. The longitudinal movement of said extensible uprights and load carriage is guided by rollers mounted thereon. The rearward flanges of the stationary uprights are disposed rearwardly of and overlapping the adjacent rearward flanges of the extensible uprights while the forward flanges of each of the stationary and extensible uprights are shorter than the corresponding rearward flanges. The apparatus may be disassembled by rotating the extensible uprights away from the stationary uprights in a plane perpendicular to the direction of movement of said extensible uprights without removing rollers.

BACKGROUND OF THE INVENTION

The present invention relates generally to lift trucks and more specifically to an improved load lifting apparatus mainly composed of an upright or mast structure employed for handling merchandise and other load materials. Lift trucks are generally employed for elevating, storing and transporting desired load materials, and are widely used together with various attachments.

In general, conventional upright assemblies or masts have included a pair of laterally spaced stationary uprights (outer masts) fixed to the forward end of the industrial lift truck and a pair of slidingly extensible or telescopingly arranged extensible uprights (inner masts) movable relative to said stationary uprights. The load engaging means, such as lift forks, is arranged to move longitudinally along the extensible uprights which, in turn, are movable along said stationary uprights by means of guide rollers thereon. Upright assemblies including stationary uprights and extensible uprights having various combinations of cross sectional form and relative disposition have been proposed. Among these, the structure disclosed in U.S. Patent No. 3,213,967 issued on Oct. 26, 1965 to R. Hastings, Jr. et al. is well known for its simplicity. The upright assembly disclosed therein includes stationary uprights having a channel shaped cross-section and extensible uprights substantially in the form of I-beams, the adjacent flanges thereof being arranged to overlap each other. The principal features of this prior art arrangement are as follows:

(1) The stationary uprights are provided with rollers adjacent their top, and the extensible uprights are provided with rollers near their bottom. These sets of rollers take the forward bending stress on the mast structure when the extensible uprights are raised and lowered. In addition, the load carriage is provided with two pairs of rollers, the upper of these pairs of rollers being slightly cocked or canted in a direction opposite to the direction in which the lower of these pairs of rollers are cocked or canted.

(2) The flanges of the stationary and extensible uprights are provided with cut-outs at one end thereof to permit the guide rollers in each upright to move forwardly into the channel of the other upright when the uprights are in their fully extended positions, said cut-outs being in alignment with the rollers so as to permit the assembly and disassembly of the uprights without removing the rollers.

SUMMARY OF THE INVENTION

Generally speaking, the primary object of the present invention is to improve the general features and concepts of the above-described mast structure by providing a mast structure which includes a channel-shaped stationary uprights disposed in spaced relation so that the channels face inwardly and spaced I-shaped extensible uprights, each forward flange of said uprights being shorter in length than the corresponding rear flange, adjacent forward flanges of said uprights not being in overlapping relation with each other. This arrangement permits easy disassembly of the uprights by means of rotating the extensible uprights forwardly away from the stationary uprights in a plane perpendicular thereto. Rather than having to fully extend the extensible uprights, as required in the known mast structures, the extensible uprights according to the invention can be disassembled from the stationary uprights by lowering them an additional distance almost equal to the diameter of the lower rollers thereof below their ordinary bottom position. Accordingly, disassembly can be accomplished in a room wherein the extension of the uprights in an upwardly direction would not be possible.

A further object of the present invention is to provide a load lifting apparatus in which the peripheral surface of the rollers is supported perpendicular to the webs of the uprights in which they ride and the corner of each roller is arranged to contact its respective upright at the inside corner formed between the rear flange and web of that upright. Rollers thus arranged are adapted to resist the lateral driving force on both the extensible uprights and load carriage.

Still a further object of this invention is to provide a load lifting apparatus wherein the webs of the stationary uprights are so extended that their forward flanges are in line with the forward flanges of the extensible uprights. Accordingly, the rollers engaged in the channels of the stationary uprights are larger in diameter than the conventional rollers. These enlarged rollers reduce the stress of contact applied on the stationary uprights.

Another object of the invention is to provide a load lifting apparatus wherein the hydraulic mechanism for raising the extensible uprights and load carriage is protected from destruction during a collision by the stationary uprights.

Still other objects and advantages of the invention will in part be obvious and will in part be apparent from the specification.

The invention accordingly comprises the features of construction, combination of elements, and arrangement of parts which will be exemplified in the construction, hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 2 is a side elevation of the mast structure;

FIG. 3 is a front elevational view;

FIG. 6 is a side elevational view of the mast structure showing the extensible uprights lowered to their lowest position;

FIG. 7 is a side elevational view of the same showing the manner in which the extensible uprights are further lowered to be free from contact with rollers therebetween and the stationary uprights;

FIG. 11 is a simplified plan view showing the extensible uprights being disassembled from the stationary uprights; and FIGS. 12 and 13 are other embodiments of the present invention in which cross-sections of their stationary uprights are modified.

DESCRIPTION OF THE PREFERRED EMBODIMENTS

Figure 1:
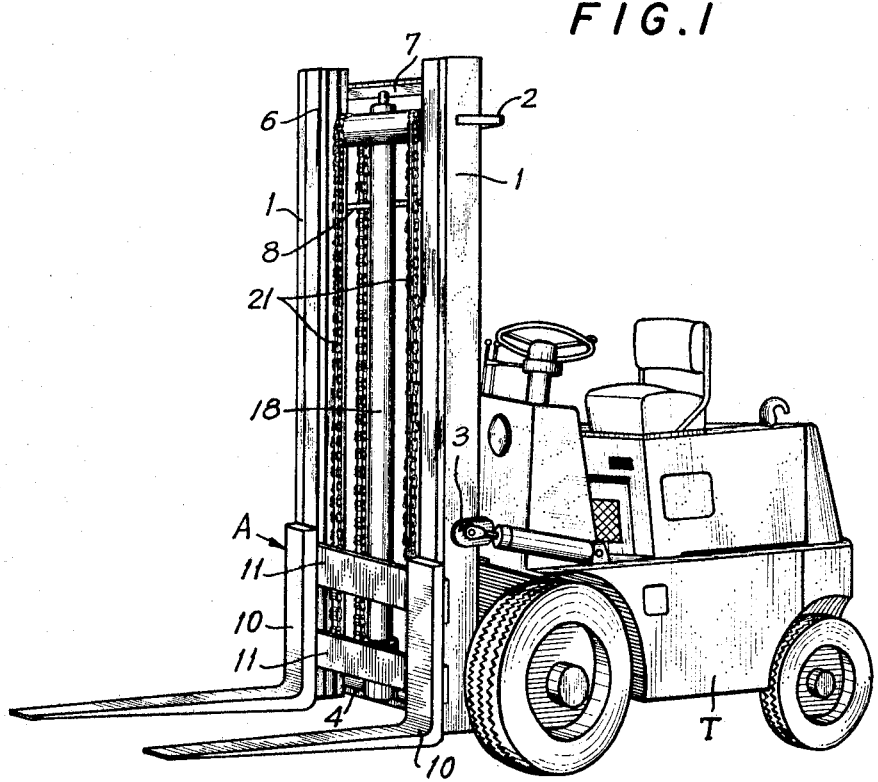
FIG. 1 is a perspective view of the lift truck provided with the load lifting mechanism according to the present invention.
Figure 4:
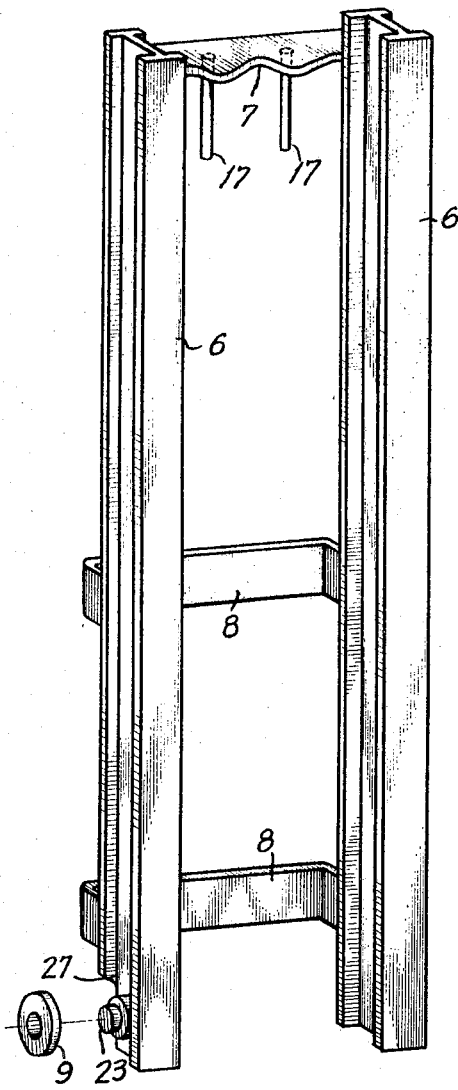
FIG. 4 is a perspective view of the extensible uprights.
Figure 5:
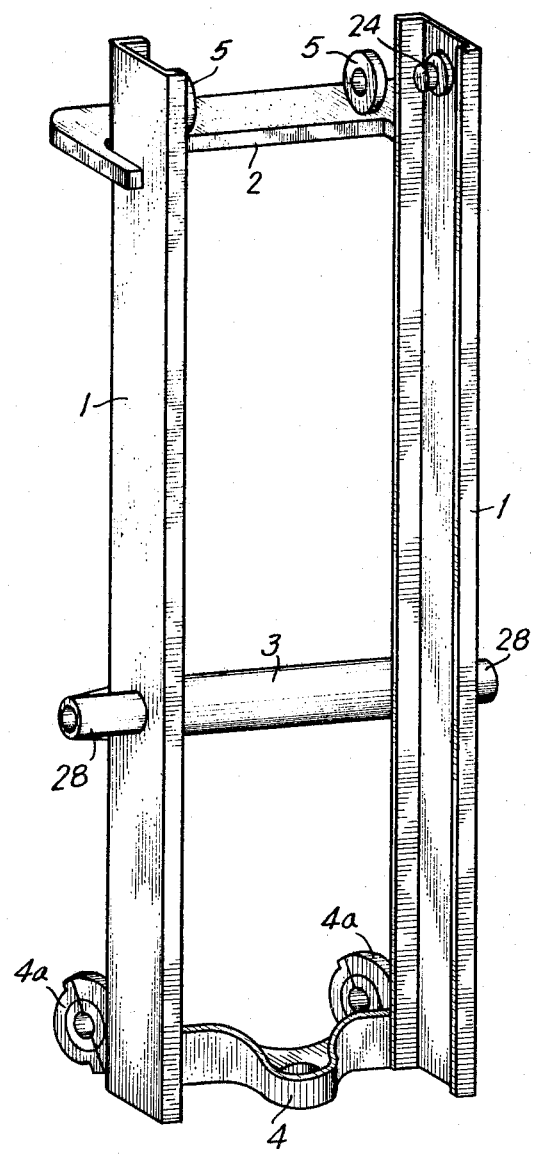
FIG. 5 is a perspective view of the stationary uprights.
Figure 8:
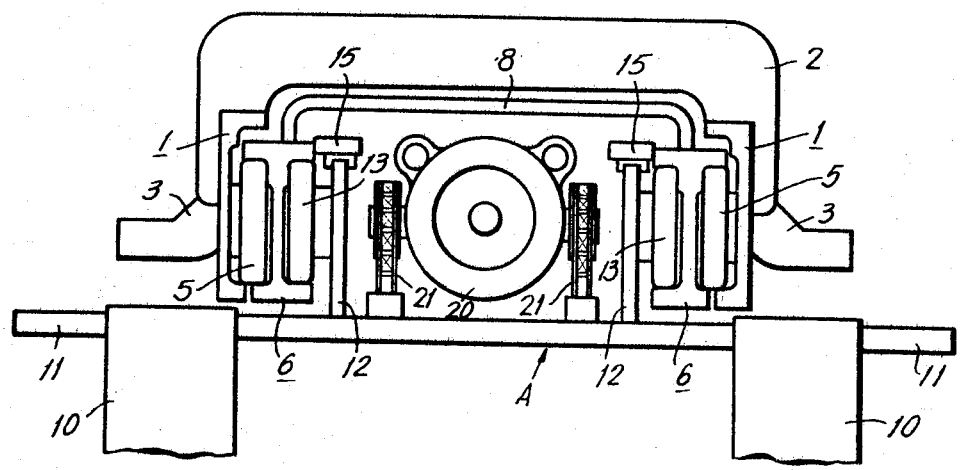
FIG. 8 is a plan view of the mast structure shown in FIG. 3.

Referring now to FIGS. 1, 2 and 3, the load lifting mechanism according to the present invention comprises a pair of laterally spaced stationary uprights 1 which are of channel-shaped cross-section and are firmly braced together by lateral beams 2, 3 and 4 so that their channels are in facing relation. Said stationary uprights 1 are secured to the forward end of the side frames of a base T, in this case a conventional lift truck, by a pair of connections 4a extending rearwardly of the lower lateral beam 4. Movable laterally spaced extensible uprights 6 of I-shaped cross-section are engaged in the channels of said stationary uprights 1. Said extensible uprights 6 are braced together in facing relation by lateral beams 7 and 8, and are adapted for longitudinal movement with respect to stationary uprights 1, in a manner hereinafter more fully described.

The load carriage A which has finger bars 11 and forks 10 mounted thereon is of a conventional construction frequently employed in industrial lift trucks and other similar devices. Said load carriage is disposed on extensible uprights 6 and is adapted for longitudinal movement with respect thereto. As seen in FIGS. 2, 3, 5, 8 and 9, each stationary upright 1 is provided with an upper roller 5 located adjacent the top thereof on a stub shaft 24 suitably fixed to the inside of the web 1c. As seen in FIGS. 2, 3, 4 and 10, each extensible upright 6 is provided with a lower roller 9 located adjacent the bottom thereof on a stub shaft 23 suitably fixed to the outside of web 6c. Rollers 5 engage in the outer side channel of the extensible uprights between flanges 6a and 6b, while rollers 9 engage in the inner side channel of the stationary uprights between flanges 1a and 1b. Rearward flanges 1b and 6b of the uprights 1 and 6 respectively are in overlapping relation, flange 6b being in the forward position. The forward flanges 1a and 6a of the upright 1 and 6 are shorter in length than rearward flanges 1b and 6b, respectively. Flanges 1a and 6a are disposed in the same plane.

The space between the forward and rearward flanges (the width of the channel) of the stationary uprights is larger than that of the extensible uprights 6 while the lower rollers 9 are larger in diameter than the upper rollers 5. The foregoing construction is permitted in the arrangement according to the invention since thrust rollers 15, which support the load carriage A contact the outer edge of rearward flange 6e rather than the outer edge of forward flange 6a of the extensible uprights as is the case in the conventional arrangements. For this reason, web 1c can extend forwardly a greater distance, thereby enabling the use of rollers 9 of larger diameter than the corresponding rollers of the conventional arrangements.

This construction offers several advantages over the constructions of the prior art. Thus, in conventional arrangements, the stationary uprights 1 had a poorer section modulus and particularly lower strength than the extensible uprights 6. Many arrangements have been attempted to improve on this defect in the conventional uprights, however, it was found that the extension of web 1c rearwardly was prevented by the existence of the driving means for the lift truck, the extension of the width of flanges 1a and 1b was impractical due to the resulting obstruction of the view of the operator of the truck, while the extension of the web 1c forwardly was prevented by the existence of the thrust rollers. On the other hand, the increased length of webs 1c of stationary uprights 1 in accordance with the invention greatly increases the ability of said stationary upright to resist the bending moment applied thereto.

The free lift of a lift truck is the maximum height to which the fork may be lifted from their lowest position without rising above the overall height of the stationary upright. In lift trucks having a large free lift, the loading operation is often carried out while the extensible uprights 6 remain at their lowest position irrespective of the movement of load carriage A. The impact produced by the load is thus applied constantly and repeatedly at a certain position on the stationary uprights through lower rollers 9. Since the diameter of the lower rollers 9 of lift trucks according to the invention is larger than the diameter of corresponding conventional rollers, the stress of contact applied to the stationary uprights 1 at the above mentioned point is greatly reduced over the stress of contact of conventional rollers. Accordingly, the life of the stationary uprights is greatly increased.

Load carriage A and extensible uprights 6 are operated by means of hydraulic mechanism 18 and a pair of chains 21. In conventional lift trucks, hydraulic mechanism 18 has been located so that its front position lies between the plane defined by the front surfaces of the two stationary uprights 1 and the plane defined by the front surfaces of the two extensible uprights 6. However, in the fork lift according to the invention the stationary uprights are extended forwardly and the front surfaces of both uprights are aligned in a single plane ahead of the front surface of the hydraulic mechanism 18. With this construction, the hydraulic mechanism is protected from destruction if the fork lift is involved in a collision at a time when the extensible uprights are lifted. If a similarly disposed conventional fork lift were involved in such a collision, the hydraulic mechanism would be severely damaged since its front surface is ahead of the stationary uprights.

Figure 9:
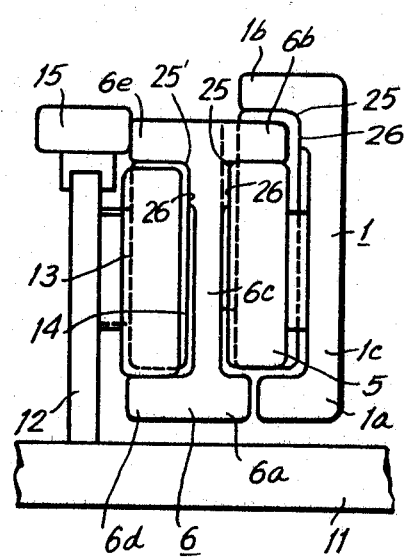
FIG. 9 is a detail plan view showing the important parts of FIG. 8.
Figure 10:
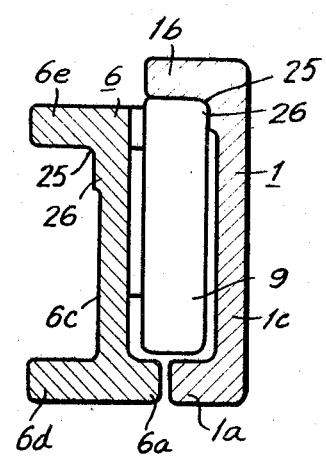
FIG. 10 is a cross-sectional view of the mast structure taken at line X—X of FIG. 6 and looking in the direction indicated by the arrow.

As shown in FIGS. 9 and 10, at normal load conditions, the inner walls of the rear flanges 1b and 6b each contact substantially all of the peripheral surfaces of rollers 9 and 5 respectively. The inner walls of the forward flanges 1a and 6a each are spaced from and face about half of the peripheral surface of both rollers 9 and 5. This space between the inner surface of flanges 1a and 6a and the peripheral surface of rollers 9 and 5 provide the clearance required for effective operation of the rollers.

A curved surface is provided at the inside corners 25 formed by the rearward flanges 1b and webs 1c, and rearward flanges 6b and webs 6c. A similar curved inside corner 25' is formed by web 6c and rearward flange 6e, which together with flange 6d, guide the rollers of load carriage A in a manner to be described below. Curved surfaces 25 and 25' each have a radius of curvature which is almost equal to that of the adjacent side corner of their respective rollers, said rollers being in contact with said corners. This arrangement provides lateral stability to the fork lift, and in particular, to extensible uprights 6, without requiring the cocking of each roller relative to the uprights, as required in conventional fork lifts.

In order to limit the friction which would occur between the inner walls of the webs 6c and 1c and the side surface of the corresponding rollers adjacent thereto when said rollers move along the uprights and are forced into contact with the webs by lateral thrust under load and strains in various parts, a gentle slope 26 is formed on said webs. Slope 26 is a continuation of the curved surface of inside corners 25 and 25' and occupies only a portion of the webs. The balance of the webs are cut-out to leave a space so that most of said roller side surface does not contact said web directly, thereby minimizing friction.

Experiments have shown that undesirable effects, as described below, result if the slope 26 is formed at too large an oblique angle. Thus, when the extensible uprights are lifted almost to their highest position, occasionally, the peripheral rolling surfaces of rollers 5 and 9, due to thrust forces, are transferred from the inside wall of rearward flanges 1b and 6b to the inside wall of forward flanges 6a and 1a. This could occur when a load is loaded on the lift fork in a position away from the normal load center shifting the working point of the load rearwardly beyond the death point and tilting the stationary uprights rearwardly around the axis of connection 4a which connects the stationary uprights to the lift truck. If this occurs, the thrust forces would draw the rollers nearer to the webs in proportion, both to the space existing between the peripheral surface of the rollers and the inside wall of flanges 6a and 1a and the oblique angle of the slope, whereby the contacting point which receives the lateral thrust transferred from the inside corner 25 to a position away therefrom along slope 26. When the rolling surfaces returned to the normal position under this condition, its complete return to the former position will be obstructed at certain values of such lateral thrust and the slope 26 would then receive concentrated frictional damage, partially because the roller rotates on the slope in such a manner that the corner of the outer peripheral surface of the roller contacts with slope 26 instead of with the inner wall of the respective rearward flange.

It has been found that it is desirable to set the angle of slope 26 at about 1 to 4 degrees to ensure a complete return of the roller, said slope extending at that angle away from the adjacent corner. Aside from slope 26, the web is partially cut-out as described above to avoid contact between the web surface and the forward end of the roller which might be caused by the smallness of the oblique angle of slope 26. In this way, friction is minimized. Where a big eccentric load is located on the load carriage, slope 26 receives lateral thrust at the area where it contacts with the forward end of the roller. The damage (wear) at that area increases as the condition is repeated. In such a case, the frictional resistance can be maintained below a predetermined value by setting the slope at a desired length.

It will be easily understood that a conventional arrangement in which each roller is secured on the upright and cocked in a certain oblique angle to the upright is much more difficult to produce than the present apparatus in which each roller is supported horizontally and which can produce the same effect as the conventional arrangement.

It is to be noted that according to the aforesaid construction of uprights in which forward flanges 1a are aligned with forward flanges 6a, the cut-out normally provided on the forward flanges 1a of the conventional fork lifts to enable the assembling of upper rollers 5 are eliminated and the strength of the stationary uprights is therefore improved. Moreover, the shortened forward flanges 1a are advantageous in that they facilitate the easy and simple disassembly of the uprights.

To disassemble the extensible uprights 6 from the stationary uprights 1 in the state when the extensible uprights are lowered to the lowest position as seen in FIG. 6, a pair of stoppers 16 fixed to the upper part of the extensible uprights 6 are taken off and the extensible uprights are lowered until the lower surface of lateral beam 7 secured to said uprights meets the upper surface of lateral beam 2 secured to the stationary uprights, as shown in FIG. 7. Then rollers 5 are completely projected above the upper end of the extensible uprights 6 and roller 9 are projected below the lower end of the stationary uprights 1, and the limitations on the relative movement of both uprights are greatly released. Disassembly of the extensible uprights in the forward direction may then be carried out by rotating said extensible uprights in the plane perpendicular to said uprights, as shown in FIG. 11.

In ordinary load lifting, the lower roller 9 contacts the flange 1b of the stationary uprights and the upper roller 5 contacts the flange 6b of the extensible uprights, and these rollers receive the forward bending tension applied to the mast structure while the extensible uprights are lifted or lowered. It may occur, as aforementioned, that the rolling surfaces of the roller 9 and the roller 5 are transferred from flange 1b to 1a, and flange 6b to 6a, respectively. The present invention is adapted to promote the strength of the stationary uprights 1 as well as to simplify disassembly of the both uprights, as aforesaid, and in this embodiment, the extensible uprights 6 are provided with shortened flange 6a without changing other cross-sectional dimensions of said uprights. For this reason, the stress produced in the extensible uprights 6 when a bending moment caused by the load is applied thereto, is rather large compared with that produced in conventional extensible uprights. However, in the arrangement according to the invention, the forward flange 6a receives compressive force and the rearward flange 6b receives tensile force. The compressive stress in the extensible uprights 6 is slightly increased because of their shortened forward flange, but this presents no practical obstacle since the compressive strength of the extensible uprights is considerably higher than the tensile strength thereof when the uprights are simply bended.

Furthermore, the extensible uprights 6 of the present invention, due to the shortened forward flange, have an improved modulus of section and margin of safety when compared with that of conventional stationary uprights. Further, extensible uprights according to the invention are advantageous due to their economy of material. The increase in the surface pressure of the rolling surface when a bending moment is applied rearwardly thereto caused by the shortness of the flange, can be neglected because the moment is extremely small and rarely produced. Thus, according to the structure of the present invention, inside of the flanges 1a and 6a would confront such a moment by contacting the outer peripheral surface of the roller along the width thereof to define a line contact. This arrangement avoids the scratching damage which might be produced on the inner surface of corresponding flanges of conventional construction which contact the roller at a point contact when bending moment is applied rearwardly thereto due to the cocked or inclined alignment of the roller of such conventional arrangement.

The load carriage A is provided with two pairs of rollers 13 and 14, pair of rollers 13 being disposed adjacent the upper part of said carriage A and pair of rollers 14 being disposed adjacent the lower part thereof. These rollers 13 and 14 are carried by laterally spaced brackets 12 located on and projecting from the rear face of finger bar 11 and extend rearwardly therefrom toward and inwardly of the extensible uprights 6. Each bracket carries an upper roller 13 and a lower roller 14, with such lower roller 14 thereby engaging the inside corner of the extensible uprights 6 between flanges 6d and 6e. The load carriage A is thus fitted for longitudinal movement with respect to the extensible uprights 6. In the embodiment shown in FIG. 9, the lower roller 14, opposite of the roller 5, is so secured as to contact the inside corner 25' of the extensible uprights defined by flange 6e and web 6c, while the upper roller 13 is secured apart from said web 6c and at a position retracted inwardly with respect to the lower roller 14. The reason for this lies in that the frictional contact between the upper roller 13 and the inside corner 25' would restrain the rotation of the upper roller 13, if the side thrust due to an eccentric load on load carriage A forced said upper roller against inside corner 25', since said upper roller 13, but not lower roller 14, always rotates along the inside wall of the flange 6d.

To provide lateral stability for the load carriage A, said load carriage is equipped with two thrust rollers 15. These rollers are each carried on the projecting end of the upper part of each bracket 12, and are disposed to rotate on the inner end of the flange 6e, facing the balance of the rollers at a right angle, in order to confront with the eccentric load to the load carriage A. In cooperation with the lower roller 14, rollers 15 are adapted to accommodate any eccentric loads on load carriage A.

It is generally noted that the distance between the forward flanges of the extensible uprights 6 tends to extend sideways when the forks 10 are loaded, and particularly when most of the load is concentrated on only one of the forks. By engaging thrust roller 15 with the rearward flange 6e of the extensible uprights at a point near the rigid connection provided by lateral beams 7 and 8, the bending moment tending to extend the distance between said extensible uprights 6 is decreased.

As mentioned above, load carriage A and extensible uprights 6 are operated through a pair of flexible link chains 21 by hydraulic mechanism 18. Since this arrangement is well known in the prior art, a detailed description of the structure and mechanism will not be given. Generally, a hydraulic ram mechanism 18 vertically secured on the lateral beam 4 of the stationary uprights 1 produce longitudinal movement of extensible uprights 6 and the load carriage A. Longitudinally extensible piston rod 19 engages in ram 18. Head member 20 is secured to the upper end of the piston rod 19 and supports a pair of sprockets. A pair of holding bars 17 hold the hydraulic ram mechanism suspended from the lateral beam 7 fixed to the uppermost part of the extensible uprights and loosely fitted in said head member 20. One end of link chains 21 is adjustably engaged to a support plate 22 secured to the hydraulic ram mechanism and the other end is secured to the load carriage A through said sprockets. Tubular shaft 28 projects outwardly from the stationary uprights and connects to the hydraulic ram mechanism which enables forward and rearward tilting motion of the uprights.

Referring now to FIGS. 12 and 13 of the drawing, other embodiments of the lift truck according to the invention are shown in which mast structure is modified. FIGS. 12 and 13 correspond to and show the same portions of the lift truck according to the invention as are shown in FIG. 9 with respect to the principal embodiment. The lift truck of FIGS. 12 and 13 are provided with stationary uprights 101 and 201 and extensible uprights 106 and 206. The distance between the inner walls of the rearward flange 101b and 201b and the forward flanges 101a and 201a is substantially equal to the distance between the inner walls of the rearward flanges 106b and 206b and the forward flanges 106a and 206a. Upper rollers 105 and 205 which ride in the outer side channels of the extensible uprights 106 and 206 are of the same diameter and construction as lower rollers 109 and 209 which ride in the inner side channels of the stationary uprights.

The rearward flanges 101b and 106b (FIG. 12), and 201b and 206b (FIG. 13) are in overlapping relation. The forward flanges 101a and 106a (FIG. 12), and 201a and 206b (FIG. 13) are shorter than that of said rearward flanges. In the manner of the first described embodiment, easy disassembly of the uprights can be obtained in a room having no longitudinal space to lift the extensible uprights to the maximum lifting position. The remaining structure and mechanism of the lift trucks shown in FIGS. 12 and 13 are as previously described.

It will thus be seen that the objects set forth above, among those made apparent from the preceding description, are efficiently attained and, since certain changes may be made in the above article without departing from the spirit and scope of the invention, it is intended that all matter contained in the above description and shown in the accompanying drawing shall be interpreted as illustrative and not in a limiting sense.

What is claimed is:

1. A load lifting apparatus comprising a base, a pair of laterally spaced apart stationary uprights secured to said base, a pair of laterally spaced apart extensible uprights adapted for longitudinal movement with respect to said stationary uprights, rollers positioned between said stationary uprights and extensible uprights for guiding the latter in its movement and a load carriage, said stationary uprights being of substantially channel-shaped cross-section and having their channels opening towards one another in opposed relationship, said extensible uprights being of I-shaped cross-section, the rearward flanges of said stationary uprights being disposed rearwardly of and overlapping the adjacent rearward flanges of said extensible uprights, the length of the forward flanges of said stationary uprights being shorter than those of the rearward flanges thereof, the length of the forward flanges of said extensible uprights being shorter than that of rearward flanges thereof so as to enable the disassembling of said extensible uprights forwardly of said stationary uprights by rotating the same in a plane perpendicular to the direction of said movement thereof from said stationary uprights, and a load carriage incorporating upper and lower rollers at one side of said extensible uprights for guiding said load carriage longitudinally with respect to said extensible uprights.

2. A load lifting apparatus according to claim 1, wherein a curved surface is provided at the inside corner of the respective channels of the uprights whose radius of curvature is substantially equal to that of the roller which contacts with said corner, and wherein a gentle slope is provided as a continuation of said curved surfaces.

3. A load lifting apparatus according to claim 1, wherein the forward flanges of said stationary upright lie in the same plane as said forward flanges of said extensible uprights, and wherein the lower rollers are supported by said extensible uprights and guided for longitudinal movement of the same in cooperation with the upper rollers supported by said extensible uprights, said lower rollers being of larger diameter than said upper rollers.

4. A load lifting mechanism according to claim 1, wherein a stopper means is provided between upper part of said extensible uprights and stationary uprights so as to expose the upper rollers completely above the upper end of said extensible uprights, and the lower rollers completely below the lower end of said stationary uprights when said stopper means is taken off, whereby said extensible uprights are capable of being lowered an additional distance for enabling the disassembly of said extensible uprights forwardly upon rotation thereof in the plane perpendicular to the direction of said movement of the same from said stationary uprights.

5. A load lifting apparatus according to claim 1, wherein all the rollers are supported rotatably around the axis mounted at a right angle to the web of said uprights, and wherein two additional thrust rollers are supported rotatably on brackets projected from said load carriage for engagement with each inside edge of the respective rearward flanges of said extensible uprights.

References Cited

UNITED STATES PATENTS 3,213,967  10/1965  Hasting _____ 187—9
3,298,463  1/1967  McIntosh _____ 187—9

HARVEY C. HORNSBY, Primary Examiner

U.S. Cl. X.R.

187—95